US010865150B2

(12) United States Patent
Kalo

(10) Patent No.: US 10,865,150 B2
(45) Date of Patent: Dec. 15, 2020

(54) OPEN VESSELS AND THEIR USE

(71) Applicant: BASF SE, Ludwigshafen am Rhein (DE)

(72) Inventor: Benedikt Kalo, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/096,922

(22) PCT Filed: May 10, 2017

(86) PCT No.: PCT/EP2017/061123
§ 371 (c)(1),
(2) Date: Oct. 26, 2018

(87) PCT Pub. No.: WO2017/198506
PCT Pub. Date: Nov. 23, 2017

(65) Prior Publication Data
US 2019/0119169 A1   Apr. 25, 2019

(30) Foreign Application Priority Data

May 18, 2016  (EP) .................................... 16170132
Jul. 4, 2016   (EP) .................................... 16177743

(51) Int. Cl.
| C04B 41/00  | (2006.01) |
| C04B 35/622 | (2006.01) |
| B32B 18/00  | (2006.01) |
| C04B 35/01  | (2006.01) |
| F27B 14/10  | (2006.01) |
| H01M 4/525  | (2010.01) |
| H01M 4/36   | (2006.01) |
| H01M 4/62   | (2006.01) |
| C04B 41/87  | (2006.01) |
| C01G 53/00  | (2006.01) |

(Continued)

(52) U.S. Cl.
CPC ........ *C04B 35/62236* (2013.01); *B32B 18/00* (2013.01); *C01G 45/1228* (2013.01); *C01G 51/006* (2013.01); *C01G 51/40* (2013.01); *C01G 51/42* (2013.01); *C01G 51/50* (2013.01); *C01G 53/006* (2013.01); *C01G 53/42* (2013.01); *C01G 53/50* (2013.01); *C04B 35/01* (2013.01); *C04B 35/016* (2013.01); *C04B 35/106* (2013.01); *C04B 35/14* (2013.01); *C04B 35/185* (2013.01); *C04B 35/195* (2013.01); *C04B 35/505* (2013.01); *C04B 35/64* (2013.01); *C04B 41/009* (2013.01); *C04B 41/4501* (2013.01); *C04B 41/87* (2013.01); *F27B 14/10* (2013.01); *H01M 4/366* (2013.01); *H01M 4/505* (2013.01); *H01M 4/525* (2013.01); *H01M 4/62* (2013.01); *B32B 2311/24* (2013.01); *B32B 2315/02* (2013.01); *B32B 2439/02* (2013.01); *C01P 2002/32* (2013.01); *C01P 2002/50* (2013.01); *C01P 2004/51* (2013.01); *C01P 2004/61* (2013.01); *C01P 2004/80* (2013.01); *C04B 2235/3203* (2013.01); *C04B 2235/3217* (2013.01); *C04B 2235/3262* (2013.01); *C04B 2235/3275* (2013.01); *C04B 2235/3279* (2013.01); *C04B 2235/526* (2013.01); *C04B 2235/5224* (2013.01); *C04B 2235/5228* (2013.01); *C04B 2235/5236* (2013.01); *C04B 2235/5244* (2013.01); *C04B 2235/5248* (2013.01); *C04B 2235/5264* (2013.01); *C04B 2235/5436* (2013.01); *C04B 2235/6562* (2013.01); *C04B 2235/6565* (2013.01); *C04B 2235/6567* (2013.01); *C04B 2235/72* (2013.01); *C04B 2237/34* (2013.01); *C04B 2237/343* (2013.01); *C04B 2237/348* (2013.01); *C04B 2237/38* (2013.01); *F27B 2014/102* (2013.01); *H01M 10/0525* (2013.01); *H01M 2004/028* (2013.01)

(58) Field of Classification Search
CPC ... C04B 35/62236; C04B 35/64; C04B 35/14; C04B 41/4501; C04B 41/87; C04B 2237/38; H01M 4/505; H01M 4/366; F27B 14/10; B32B 2439/00; B32B 1/02
See application file for complete search history.

(56) References Cited

U.S. PATENT DOCUMENTS 4,032,390 A * 6/1977 Rice ........................ C30B 15/00
                                                   117/25
5,120,029 A   6/1992 Durbin
(Continued)

FOREIGN PATENT DOCUMENTS

CN       103880458 A    6/2014
EP       0 965 663 A1   12/1999
(Continued)

OTHER PUBLICATIONS

Naslain et al. Ceramic Matrix Composites: Matrices and Processing. Encyclopedia of Materials: Science and Technology, 2001, pp. 1060-1066.*

(Continued)

*Primary Examiner* — Noah S Wiese
(74) *Attorney, Agent, or Firm* — Oblon, McClelland, Maier & Neustadt, L.L.P.

(57) ABSTRACT

Vessels such as crucibles, pans, open cups and saggars, containing a monolithic ceramic material, and a ceramic matrix composite, wherein the monolithic ceramic material is an inner part. A method for making oxide materials that can be utilized in the contact with corrosive materials and that allows for higher conversions in a given heating process.

20 Claims, No Drawings

(51) Int. Cl.
  *C04B 41/45* (2006.01)
  *C04B 35/64* (2006.01)
  *H01M 4/505* (2010.01)
  *C01G 51/00* (2006.01)
  *C01G 45/12* (2006.01)
  *C04B 35/106* (2006.01)
  *C04B 35/14* (2006.01)
  *C04B 35/185* (2006.01)
  *C04B 35/195* (2006.01)
  *C04B 35/505* (2006.01)
  *H01M 10/0525* (2010.01)
  *H01M 4/02* (2006.01)

(56) References Cited

U.S. PATENT DOCUMENTS

| | | | |
|---|---|---|---|
| 5,858,486 A * | 1/1999 | Metter | C04B 35/83 428/34.1 |
| 6,524,668 B1 | 2/2003 | Tsuji et al. | |
| 2003/0113449 A1 | 6/2003 | Tsuji et al. | |
| 2008/0292791 A1 | 11/2008 | Bewlay et al. | |
| 2008/0292804 A1 | 11/2008 | Bewlay et al. | |
| 2012/0112391 A1 * | 5/2012 | Bochiechio | C04B 35/057 266/280 |
| 2014/0038119 A1 | 2/2014 | Goski et al. | |
| 2014/0154437 A1 | 6/2014 | Schroeder et al. | |
| 2015/0354897 A1 * | 12/2015 | Sachs | F27B 14/10 65/24 |

FOREIGN PATENT DOCUMENTS

| | | |
|---|---|---|
| EP | 2 450 656 A1 | 5/2012 |
| JP | 9-263482 A | 10/1997 |
| JP | 3279916 B2 | 4/2002 |
| WO | WO 97/05062 A1 | 2/1997 |
| WO | WO 2014/123801 A1 | 8/2014 |

OTHER PUBLICATIONS

International Search Report dated Aug. 14, 2017 in PCT/EP2017/061123 filed on May 10, 2017.
International Preliminary Report on Patentability completed on Aug. 1, 2017 in PCT/EP2017/061123 filed on May 10, 2017.
Extended European Search Report dated Oct. 31, 2016 in Patent Application No. 16170132.1, 5 pages.

* cited by examiner

OPEN VESSELS AND THEIR USE

The present invention is directed towards vessels selected from crucibles, pans, open cups and saggars essentially comprising of two components, from which
  (A) one component being a monolithic ceramic material,
  (B) the second component being a ceramic matrix composite,
and wherein component (A) is the inner part, or inlay.

In addition, the present invention is directed towards the use of inventive vessels, and a method to manufacture inventive vessels.

Lithiated transition metal oxides are currently being used as cathode active materials for lithium-ion batteries. Extensive research and developmental work has been performed in the past years to improve properties like charge density, energy, but also other properties like the reduced cycle life and capacity loss that may adversely affect the lifetime or applicability of a lithium-ion battery. Additional work has been spent to improve manufacturing methods.

In a usual process for making cathode materials for lithium-ion batteries, first a so-called pre-cursor is being formed by co-precipitating the transition metals as carbonates, oxides or preferably as hydroxides that may or may not be basic. The precursor is then mixed with a lithium salt such as, but not limited to LiOH, $Li_2O$, $LiNO_3$ or—especially—$Li_2CO_3$—and calcined (fired) at high temperatures. Lithium salt(s) can be employed as hydrate(s) or in dehydrated form. The calcination—or firing—generally also being referred to as thermal treatment of the precursor is usually carried out at temperatures in the range of from 600 to 1,000° C. During the thermal treatment a solid state reaction takes place, and the cathode active material is formed. The thermal treatment may be performed in the heating zone of an oven or kiln.

Two general types of achieving the transportation of the precursor into the heating zone—and removal of the cathode active material from the heating zone—are most widely used. One type is to move a stream of powder through the heating zone, for example in a rotary kiln. Rotary kilns have the challenge, though, that the strongly corrosive precursor may damage the kiln material.

In addition, rotary kilns are quite disadvantageous for multi-product facilities where cross contamination may be of concern.

Another type of methods comprises the steps of putting the precursor into vessels, for example crucibles or saggars, and moving such vessels through the heating zone of an oven or of a kiln. The method allows quite comfortably allows product changes for multi-product facilities. Although the extent of effects of corrosion is reduced, this method has a common disadvantage due to the long time needed for heating the vessel. Usually, such vessels are made from a ceramic material. Such ceramic materials tend to behave as thermally insulating material. Precursor next to the walls of the vessels or in the core of the bulk take longer to heat than on the upper surface, and therefore may require much longer reaction times. Furthermore, in order to avoid damage to the ceramic vessels, for example by thermal shock causing cracks, they can only be heated slowly. Typical heating rates are in the range of from 1 to 3° C./min. The same challenge applies to cooling after the thermal treatment. Much space is needed in production facilities to achieve a crack-free heating and cooling.

Some materials, such as certain ceramic matrix composites, do not have the same heating and cooling rate limitations. Saggars made entirely from ceramic matrix composites might be used but the costs for ceramic matrix composites are usually quite high. Saggars made from metal, which do not require slow heating and cooling, either, often are not sufficiently corrosion-resistant.

It was therefore an objective to provide a method for making oxide materials that can be utilized in the contact with corrosive materials and that allows for higher conversions in a given heating process. It was further an objective to provide the necessary equipment for such process.

Accordingly, the process defined at the outset has been found, hereinafter also referred to as inventive process or process according to the (present) invention. In addition, the open vessels defined at the outset have been found, hereinafter also defined as inventive vessels or vessels according to the present invention. Inventive vessels will be defined in more details below.

Inventive vessels are selected from crucibles, pans, open cups and saggars. Inventive vessels are preferably open, that means in the context of the present invention that they do not have a lid. In some embodiments inventive vessels have one or more handles, but preferably they do not.

In the context of the present invention, pans and open cups each have a circular base, and they are better distinguished by the dimensions. In pans, the walls are up to 25% of the diameter of the base, for example 5 to 25%, and in open cups, the walls are from 26 to 300% of the diameter of the base.

Inventive vessels may have a base that is circular or ellipsoid or polygonal, for example rectangular or quadrangular. Preferred are rectangular and in particular quadrangular-base inventive vessels, for example rectangular and in particular square base vessels. Specific embodiments of quadrangular-base inventive vessels are those with rounded angles and especially inventive vessels with a square base with rounded angles.

Inventive vessels essentially comprise of two components, from which
  (A) one component is a monolithic ceramic material, hereinafter also referred to as monolith (A) or component (A),
  (B) the second component is a ceramic matrix composite, hereinafter also referred to as component (B) or matrix composite (B),
and wherein component (A) is the inner part, or inlay.

The two components (A) and (B) are explained in more detail below.

In the context of the present invention, "comprising essentially" means that at least 90% by weight of such inventive vessels are either component (A) or component (B). In a preferred embodiment of the present invention, components other than component (A) or component (B) amount to zero to 5% by weight of inventive vessels. Examples of optional components other than component (A) and component (B) are intermediate layers serving as bonding material between components (A) and (B). Another example of an optional component is a coating layer or a layer that enhances thermal transition. Another example of an optional component is a sealing layer that allows for handling of partly or completely molten material. In an even more preferred embodiment of the present invention, inventive vessels consist of component (A) and component (B).

In embodiments wherein inventive vessels comprise components other than component (A) and component (B), such components other than component (A) and component (B) exhibit high thermostability. For example, their melting temperature and softening temperature, if applicable, is higher than 1,100° C., for example from 1,200 to 3,000° C.

Inventive vessels comprise of a monolith (A). Said monolith (A) is a sintered ceramic material that is mainly crystalline. In one embodiment of the present invention, monolith (A) is selected from non-oxides, also referred to as non-oxide ceramics, for example a boride, nitride or carbide, especially from silicon carbide. Preferably, monolith (A) is selected from aluminum oxide, that may be doped with up to 1 molar % of $ZrO_2$ or $Y_2O_3$ or $B_2O_3$ or with a combination of at least two of the two foregoing. In one embodiment of the present invention, monolithic ceramic material (A) is selected from aluminum oxide, non-doped or doped with up to 2 mole-% by weight zirconia or yttrium oxide or boron oxide a combination of at least two of the foregoing.

Additionally, inventive vessels comprise of a matrix composite (B). Said matrix composite (B) contains ceramic fibers, and it additionally comprises a ceramic matrix material. Ceramic fibers and ceramic matrix material may have identical or different compositions. In the context of the present invention, ceramic matrix composites comprise fibers embedded in ceramic oxide or non-oxide matrices. The bonding forces between the fibers and the matrix are comparatively low. Oxide matrix materials such as aluminum oxide are preferably in particulate form.

Ceramic fibers and ceramic matrix materials may each be selected from oxide and non-oxide ceramics. Examples of non-oxide ceramics are carbides and borides and nitrides. Particular examples of non-oxide ceramics are silicon carbide, silicon boride, silicon nitride, silicon-boron-nitride, hereinafter also referred to as SiBN, silicon carbon nitride, hereinafter also referred to as SiCN, and in particular combinations from SiC and $Si_3N_4$. Preferred are oxide ceramics, hereinafter also referred to as oxide-based ceramics. Oxide ceramics are oxides of at least one element selected from Be, Mg, Ca, Sr, Ba, rare earth metals, Ti, Zr, Hf, V, Nb, Ta, Cr, Mo, W, Mn, Fe, Co, Ni, Zn, B, Al, Ga, Si, Ge, Sn, Re, Ru, Os, Ir, In, Y, and mixtures of at least two of the foregoing. Oxide-based ceramics may be selected from doped ceramics, wherein one main component is doped with up to 1 molar % components other than the main component, and from reinforced ceramics, wherein one component is the main component, for example at least 50 molar %, and one or more further components—reinforcing components—are present in ranges from 1.1 to 25 molar %. Further examples are titanates and silicates. Titanates and silicates each may have a stoichiometric composition.

Preferred example of titanates is aluminum titanate. Preferred example of silicates is magnesium silicate.

Examples of reinforced ceramics are reinforced alumina and reinforced zirconia. They may contain two or more different reinforcement oxides and may thus be referred to as binary or ternary mixtures. The following binary and ternary mixtures are preferred: aluminum oxide reinforced with 1.1 to 25% by weight of one of the following: cerium oxide $CeO_2$, ytterbium oxide $Yb_2O_3$, magnesia MgO, calcium oxide CaO, scandium oxide $Sc_2O_3$, zirconia $ZrO_2$, yttrium oxide $Y_2O_3$, boron oxide $B_2O_3$, combinations from SiC and $Al_2O_3$, or aluminum titanate. More preferred reinforcing components are $B_2O_3$, $ZrO_2$ and $Y_2O_3$.

Preferred zirconia-reinforced alumina is $Al_2O_3$ with from 10 to 20 mole-% $ZrO_2$. Preferred examples of reinforced zirconia are selected from $ZrO_2$ reinforced with from 10 to 20 mole-% CaO, in particular 16 mole-%, from 10 to 20 mole-% MgO, preferably 16 mole-%, or from 5 to 10 mole-% $Y_2O_3$, preferably 8 mole-%, or from 1 to 5 mole-% $Y_2O_3$, preferably 4 mole-%. An example of a preferred ternary mixture is 80 mole-% $Al_2O_3$, 18.4 mole-% $ZrO_2$ and 1.6 mole-% $Y_2O_3$.

Preferred fiber materials are oxide ceramic materials, carbide ceramic materials, nitride ceramic materials, carbon fibers, SiBCN fibers, basalt, boron nitride, tungsten carbide, aluminum nitride, titania, barium titanate, lead zirconate-titanate and boron carbide. Even more preferred fiber materials are $Al_2O_3$, mullite, SiC, $ZrO_2$ and carbon fibers.

In one embodiment the fibers are made from aluminum oxide, and the ceramic matrix composite comprises a ceramic matrix material selected from aluminum oxide, quartz, mullite, cordierite and combinations of at least two of the foregoing. Preferred is aluminum oxide.

Preferred are creep resistant fibers. In the context of the present invention, creep resistant fibers are fibers that exhibit minimum—or no—permanent elongation or other permanent deformation at temperatures up to 1,400° C.

In one embodiment of the present invention, ceramic fibers may have a diameter in the range of from 7 to 12 μm. Their length may be in the range of from 1 mm up to 1 km or even longer, so-called endless fibers. In one embodiment, several fibers are combined with each other to yarns, textile strips, hoses, or the like. In a preferred embodiment of the present invention ceramic fibers used in the present invention have a tensile strength of at least 50 MPa, preferably at least 70 MPa, more preferably at least 100 MPa, and even more preferably at least 120 MPa. A maximum value of the tensile strength of ceramic fibers used in the present invention is 3,100 MPa or even 10,000 MPa. The tensile strength may be determined with a tensile tester. Typical measuring conditions are cross-head speeds of 1.2 to 1.3 cm/min, for example 1.27 cm/min, and 7.61 cm gauge.

In one embodiment of the present invention, the matrix is made from an oxide ceramic material or a carbide. Preferred oxide ceramic materials for the matrix are $Al_2O_3$, mullite, SiC, $ZrO_2$ and spinel, $MgAl_2O_4$.

Particularly preferred components are SiC/SiC, C/SiC, $ZrO_2/ZrO_2$, $ZrO_2/Al_2O_3$, $Al_2O_3/ZrO_2$, $Al_2O_3/Al_2O_3$ and mullite/mullite. The fiber material is in each foregoing case the first and the matrix the second material.

In one embodiment of the present invention, component (B) comprises 20 to 60% by volume ceramic fiber.

Component (B) is porous. In many cases, the total solids content of component (B) is from 50 to 80% of the theoretical, the rest is air or gas due to the pores.

In one embodiment of the present invention, component (B) has a porosity in the range of from 20% to 50%; thus, component (B) is not gas tight in the sense of DIN 623-2.

In one embodiment of the present invention, the ceramic matrix composite (B) comprises fibers from aluminum oxide and a ceramic selected from aluminum oxide, quartz, mullite, cordierite and combinations of at least two of the foregoing, for example aluminum oxide and mullite or aluminum oxide and cordierite. Even more preferably, the ceramic matrix composite (B) comprises fibers from aluminum oxide and aluminum oxide ceramic.

Component (A) is an inner part of the vessel. This means that component (A) essentially has the same shape as the inventive vessel and that component (B) serves as outer layer. Then, during operation, precursors come into contact with the inner part. Component (A) may also be termed an inlay.

In one embodiment of the present invention, inventive vessels have an average wall strength in the range of from 2 to 15 mm, preferably from 2 to 10 mm and even more preferably, from 4 to 10 mm. The base may be of the same strength or slightly thicker, for example up to 17 mm, preferably 2 to 13 mm.

In one embodiment of the present invention, in inventive vessels the angle between each wall and the basis is 90°. In a preferred embodiment, inventive vessels have bent walls, and the angle between each wall and the basis is in the range of from 91 to 100°.

In a preferred embodiment of the present invention, inventive vessels may contain 100 ml up to 25 l of particulate material, preferred are 2 l to 20 l, and even more preferred are 3 to 15 l. Smaller vessels according to the present invention are possible, but they are economically disadvantageous. In state-of-the-art vessels the heat transfer may be disadvantageous in a way that the residence time in heating and/or cooling zones is unfavorably long or in way that pronounced temperature profiles in the powder to be thermally treated are observed that are in disfavor of a homogeneous product. If heat treatment is performed in inventive vessels, heat transfer is facilitated and accelerated. That leads to improved homogeneity of the heat-treated material.

Inventive vessels are advantageous for any solid state reaction to make oxide materials from a precursor in a solid state reaction. By using inventive vessels the shortcomings of the known processes discussed at the outset may readily be overcome. Exchange of product is easy, and heating and cooling before and after the thermal treatment may be performed at much faster a rate than with vessels known.

Another aspect of the present invention is a process to manufacture inventive vessels, hereinafter also referred to as inventive manufacturing process. The inventive manufacturing process comprises several steps. The inventive process may be carried out in various embodiments. In one embodiment, the inventive manufacturing process comprises the following steps:
($\alpha$) providing component (A),
($\beta$1) contacting component (A) with a fabric from ceramic fibers soaked with a slurry containing a ceramic precursor,
($\gamma$1) optionally, compressing, vacuum treating or drying of the green body according to step ($\beta$1),
($\delta$) firing the green body obtained in step ($\beta$1) or, if applicable, ($\gamma$1).

In another embodiment, the inventive manufacturing process comprises the following steps:
($\alpha$) providing component (A),
($\beta$2) contacting component (A) with a roving, tow or filament from ceramic fiber impregnated with a slurry containing a ceramic precursor, and winding said impregnated roving, tow or filament around component (A),
($\gamma$2) optionally, compressing, vacuum treating or drying of the green body according to step ($\beta$2),
($\delta$) firing the green body obtained in step ($\beta$2) or, if applicable, ($\gamma$2).

Said steps will be explained in more detail below.

In the first step, step ($\alpha$), component (A) is provided. Component (A) is known per se. It may have been shaped by any known and suitable process, for example injection molding, isostatic or uniaxial pressing, pouring, and the like.

In a first embodiment of the inventive manufacturing process, step ($\beta$1) is performed and, optionally, step ($\gamma$1).

In step ($\beta$1) of the inventive process, component (A) is contacted with a fabric from ceramic fibers soaked with a slurry containing a ceramic precursor. Step ($\beta$1) may be performed once or repeatedly, for example two up to ten times per vessel.

The fabric may be a woven or non-woven from ceramic fibers. Even more preferred are unidirectionally oriented fibers or unidirectionally oriented rovings. Said fabric is soaked with a slurry containing a ceramic precursor. Said soaking may be formed by moving the fabric through a bath containing said slurry. In other embodiments, said soaking may be performed statically. Said soaking may be performed once or repeated several times, for example up to 10 times.

The slurry contains a so-called ceramic precursor, for example aluminum hydroxide in a sol or gel state, water, and, optionally, a filler, for example an organic or inorganic acid. The solids content of said slurry may be in the range of from 10 to 80%, preferably 20 to 60%, and more preferably 25 to 45%.

In one embodiment of the present invention, the average residence time of the fabric in said slurry is in the range of from 1 second to 24 hours, preferably 5 seconds to 10 hours, preferably 1 minute to 5 hours.

After having soaked the fabric with said slurry a prepreg is obtained. The prepreg is then contacted with inner part (A). Said contacting is performed by arranging fabric on the outer surface of component (A) in a way that the outer surface is partially or completely covered with one layer of soaked fabric. In case the soaking is performed repeatedly complete coverage may only be achieved after said repeated soaking. Said contacting may be performed with or without a lay-up. A green body is obtained.

Before firing, the green body obtained according to step ($\beta$1) may be treated according to one or more optional steps ($\gamma$1), for example vacuum treatment or pressing or drying, especially vacuum treatment or autoclave processing. Said optional steps may be performed to remove some percentage of water before firing. An optional drying step may be performed at a temperature in the range of from 10° C. to 300° C., preferably 80° C. to 200° C. Combined drying in ambient atmosphere and subsequently in an oven is preferred.

After step ($\beta$1) and, if applicable, step ($\gamma$1), the green body so obtained is fired, step ($\delta$). Step ($\delta$) may be performed by heat-treating the green body at a temperature in the range of from 800 to 1,500° C., preferably 900 to 1,400° C., preferably 1,000 to 1300° C.

Step ($\delta$) may be performed over a period of time in the range of from 10 minutes to 48 hours, preferably 30 minutes to 24 hours, preferably 1 hour to 10 hours. Dwells at different temperatures, with or without intermediate cooling, may be preferable.

In another embodiment of the inventive manufacturing process, the following steps are performed:

In step ($\alpha$) component (A) is provided, vide supra,

In step ($\beta$2), said component (A) is contacted with a roving, yarn, tow or filament from ceramic fiber impregnated with a slurry containing a ceramic precursor.

The diameter of such roving, yarn, tow or filament may be in the range of from 0.1 to 5 mm, preferably 0.2 to 3 mm, more preferably 0.3 to 2 mm.

Component (A) is contacted with said impregnated roving, yarn, tow or filament at its outer surface. For this purpose, said roving, yarn, tow or filament is moved through a slurry, for example pulled. Said slurry contains a so-called ceramic precursor, for example aluminum hydroxide in a sol or gel state, water, and optionally, a filler, vide supra. The solids content of said slurry may be in the range of from 10 to 80%, preferably 20 to 60%, more preferably 25 to 45%.

In one embodiment of the present invention, the average residence time of the fabric in said slurry is in the range of from 0.1 seconds to 5 minutes, preferably 0.2 seconds to 1 minute, even more preferably 0.5 seconds to 30 seconds.

Step (β2) comprises winding said impregnated roving, tow or filament around component (A). Said winding may include one or more layers, for example 2 to 10 layers of roving, tow or filament. Resulting from step (β2) a green body is obtained.

Before step (δ), one or more optional steps are possible, see step (γ2) mutatis mutandis.

In step (δ), the green body from step (β2) or, if applicable, step (γ2) is fired. Step (δ) may be performed heat-treating the green body at a temperature in the range of from 900 to 1,500° C., preferably 1000° C. to 1400° C. It is preferred to perform step (δ) over a period of time in the range of from 30 minutes to 24 hours, preferably 1 hour to 10 hours. Dwells at different temperatures, with or without intermediate cooling, may be preferable.

Vessels made according to the inventive manufacturing process have excellent properties for making oxide materials and especially in the calcination step of making a cathode active material. They do not only allow for simple product changeovers but also a more homogeneous product. The heating and cooling period is shorter due to an enhanced heating or cooling rate, and the turnover of inventive vessels in commercial scale processes may be enhanced compared to the turnover with vessels consisting of only one component.

Another aspect of the present invention is related to a process for making an oxide material, hereinafter also referred to as inventive process or as process according to the (present) invention, said process comprising the following steps:

(a) providing a mixture of at least two solid particulate materials, of which at least one is an oxide or hydroxide or carbonate, (b) moving said mixture in an inventive vessel through an appliance in which said mixture is subjected to a heat treatment, thereby reacting the particulate materials with each other, (c) cooling down the material resulting from step (b).

In one embodiment of the present invention oxide materials are selected from cathode active materials, especially for lithium ion batteries. Examples of cathode active materials for lithium ion batteries are $LiCoO_2$, $LiNiO_2$, $LiMnO_2$, mixed transition metal oxides with a layered structure, also referred to as lithiated layered oxides, having the general formula $Li_{(1+z)}[Ni_aCo_bMn_c]_{(1-z)}O_{2+e}$ wherein z is 0 to 0.3; a, b and c may be same or different and are selected from 0.0 to 0.8 wherein a+b+c=1; and $-0.1 \leq e \leq 0.1$, lithiated spinels ("NMO"), for example manganese-containing spinels like $LiMn_2O_4$ and spinels of general formula $Li_{1+d}M_{2-t}O_{4-d}$ wherein d is 0 to 0.4, t is 0 to 0.4 and M is a combination of Mn and at least one further metal selected from the group consisting of Co and Ni, and lithiated nickel-cobalt aluminum oxides ("NCA"), the latter being materials of general formula $Li_{(1+g)}[Ni_hCo_iAl_j]_{(1-g)}O_2$. Typical values for g, h, i, and j are: g from 0.0 to 0.1, h from 0.80 to 0.85, i=0.15 to 0.20, and j=0.02 to 0.03. In a preferred embodiment the cathode active material is selected from lithiated layered oxides, lithiated spinels and lithiated nickel-cobalt aluminum oxides.

In a special embodiment of the present invention, oxide materials are selected from $LiCoO_2$ coated layered nickel-cobalt-magnesium oxides, doped or non-doped, for example $LiCoO_2$ coated $LiNi_{0.9}Co_{0.09}Mg_{0.01}O_2$. Each thermal treatment step useful in making $LiCoO_2$ coated layered nickel-cobalt-magnesium oxides may be performed in inventive vessels.

The inventive process starts off from a mixture of at least two particulate materials, of which at least one is an oxide or hydroxide or carbonate, step (a). For example, one of the particulate materials is a lithium salt, preferably lithium oxide or lithium hydroxide or preferably lithium carbonate, $Li_2CO_3$, and one of the particulate materials is a so-called precursor, for example a hydroxide or oxide or oxyhydroxide or carbonate of a transition metal selected from Ni, Mn and Co, or a mixed hydroxide or oxide or oxyhydroxide or carbonate of at least two transition metals selected from at least two out of Ni, Mn and Co. In a preferred embodiment, one of the particulate materials is lithium carbonate and the other is a mixed oxyhydroxide of Ni, Co and Mn or of Ni, Co and Al.

In other embodiments, the inventive process starts from a so-called pre-calcinate, that is a mixture of a lithium compound and a pre-treated hydroxide.

In such particulate materials, the particles of the lithium salt and the precursor may each have an average particle diameter (D50) in the range of from 2 to 20 μm, preferably 5 to 15 μm. Lithium salt as used in step (a) of the inventive process preferably has an average particle diameter (D50) in the range of from 4 to 7 μm. It may be observed that in many embodiments of steps (a), agglomerates are formed that contain a plurality of particles selected from dried or dehydrated precursor and lithium salt.

The molar ratio of lithium to metals other than lithium may be selected within certain ranges, in case of lithiated spinels it is lithium: transition metal 1:2. In case of NCA it is from 1:1 up to 1.02:1, in case of lithiated layered oxides it is from 1:1 up to 1.86:1.

Lithium salt and precursor are mixed thoroughly and the resulting mixture is provided, step (a).

At the beginning of step (b), the mixture provided in step (a) is transferred into at least one inventive vessel. The inventive vessel together with the mixture is then moved through an appliance in which said mixture is subjected to a heat treatment, thereby reacting the particulate materials with each other. The reaction is a solid state reaction.

In one embodiment of the present invention the heat treatment in step (b) is performed at a temperature in the range of from 600 to 1,000° C. Preferably, the temperature is ramped up, for example to a first heat treatment temperature in the range of from 600 to 650° C., then to a second heat treatment temperature in the range of from 700 to 750° C., and then to a third heat treatment temperature in the range of from 850 to 900° C. In one embodiment, the mixture is maintained at each heat treatment temperature for a period of 1 to 10 hours, preferably 3 to 8 hours.

In one embodiment of the present invention the appliance in step (b) is selected from roller hearth kilns, shuttle kilns, box furnaces, and tunnel kilns.

In one embodiment of the present invention the cooling step (c) or a heating phase in step (b) is performed at a rate in the range of from 1 to 50° C./min, preferred are 5 to 25° C./min.

Due to the good properties of the inventive vessels, a very homogeneous oxide material and specially cathode active material may be obtained according to the inventive process. The heating and cooling period is shorter due to an enhanced heating or cooling rate, and the turnover of inventive vessels in commercial scale processes may be enhanced compared to the turnover with vessels consisting of only one component. In addition, due to the good corrosion stability, no detectable amounts of inventive vessel materials can be found in cathode active materials made according to the inventive process.

The invention claimed is:

1. A vessel, comprising:
   a monolithic ceramic material forming an inner part of the vessel; and
   a ceramic matrix composite,
   wherein the vessel is selected from the group consisting of a crucible, a pan, an open cup, and a saggar,
   the ceramic matrix composite comprises fibers and matrix such that the fibers are embedded in the matrix, and
   the matrix is an oxide ceramic, or a non-oxide ceramic selected from the group consisting of carbides, borides, and nitrides.

2. The vessel according to claim 1, wherein the vessel has an average wall thickness in the range of from 2 to 15 mm.

3. The vessel according to claim 1, wherein the fibers comprise aluminum oxide, and the matrix comprises at least one ceramic selected from the group consisting of aluminum oxide, quartz, mullite, and cordierite.

4. The vessel according to claim 1, wherein the vessel has a square-shaped base.

5. The vessel according to claim 1, wherein the vessel has bent walls.

6. The vessel according to claim 1, wherein the monolithic ceramic material is aluminum oxide, which is non-doped or doped with at least one selected from the group consisting of zirconia, yttrium oxide, and boron oxide.

7. The vessel according to claim 1, wherein the ceramic matrix composite comprises aluminum oxide fibers having a diameter of 7 to 12 μm, a length of 1 mm to 1 km, and a tensile strength of at least 50 MPa.

8. The vessel according to claim 1, wherein the monolithic ceramic material is aluminum oxide doped with at least one selected from the group consisting of zirconia, yttrium oxide, and boron oxide.

9. The vessel according to claim 1, wherein the vessel consists of the monolithic ceramic material, the ceramic matrix composite, and optionally an intermediate layer bonding the monolithic ceramic material and the ceramix matrix composite.

10. The vessel according to claim 1, wherein the ceramic matrix composite comprises aluminum oxide fibers and matrix comprising aluminum oxide.

11. A process for manufacturing the vessel according to claim 1, the process comprising:
   (α) providing the monolithic ceramic material,
   (β1) contacting the monolithic ceramic material with a fabric from ceramic fibers soaked with a slurry comprising a ceramic precursor, thereby obtaining a green body,
   (γ1) optionally, compressing, vacuum treating or drying of the green body, and
   (δ) firing the green body obtained from the contacting or the optionally compressing, if applicable.

12. A process for manufacturing the vessel according to claim 1, the process comprising:
   (α) providing the monolithic ceramic material,
   (β2) contacting the monolithic ceramic material with a roving, tow or filament from ceramic fiber impregnated with a slurry comprising a ceramic precursor, and winding the impregnated roving, tow or filament around the monolithic ceramic material, thereby obtaining a green body,
   (γ2) optionally, compressing, vacuum treating or drying of the green body, and
   (δ) firing the green body obtained from the contacting or the optionally compressing, if applicable.

13. A process for making an oxide material, the process comprising:
   (a) providing a mixture of at least two solid particulate materials, of which at least one is an oxide or hydroxide or carbonate,
   (b) moving the mixture in the vessel according to claim 1 through an appliance in which the mixture is subjected to a heat treatment, thereby reacting the particulate materials with each other, and
   (c) cooling down the material resulting from the moving.

14. The process according to claim 13 wherein the oxide material is a cathode active material for lithium ion batteries.

15. The process according to claim 13 wherein the heat treatment is performed at a temperature in the range of from 600 to 1,000° C.

16. The process according to claim 13, wherein the cathode active material is selected from the group consisting of a lithiated layered oxide, a lithiated spinel (NMO) and a lithiated nickel-cobalt aluminum oxide (NCA).

17. The process according to claim 13, wherein the oxide material is a cathode active material for lithium ion batteries selected from $LiCoO_2$ coated layered nickel-cobalt-magnesium oxides.

18. The process according to claim 13, wherein the appliance is selected from the group consisting of a roller hearth kiln, a shuttle kiln, a box furnace, and a tunnel kiln.

19. The process according to claim 13, wherein the cooling step (c) or a heating phase in step (b) is performed at a rate in the range of from 1 to 50° C./min.

20. A vessel, comprising:
   a monolithic ceramic material forming an inner part of the vessel; and
   a ceramic matrix composite,
   wherein the vessel is selected from the group consisting of a crucible, a pan, an open cup, and a saggar, and
   the ceramic matrix composite comprises aluminum oxide fibers having a diameter of 7 to 12 μm, a length of 1 mm to 1 km, and a tensile strength of at least 50 MPa.

* * * * *